No. 849,988. PATENTED APR. 9, 1907.
E. W. FERGUSON.
HAND SEEDING IMPLEMENT.
APPLICATION FILED DEC. 26, 1905.

Witnesses
Phil. E. Barnes.
K. Allen.

Inventor
E. W. Ferguson.
By Victor J. Evans
Attorney

UNITED STATES PATENT OFFICE.

EPPY W. FERGUSON, OF OWENSBORO, KENTUCKY, ASSIGNOR OF ONE-HALF TO STINSON LAMBERT, OF OWENSBORO, KENTUCKY.

HAND SEEDING IMPLEMENT.

No. 849,988.　　　Specification of Letters Patent.　　　Patented April 9, 1907.

Application filed December 26, 1905. Serial No. 293,425.

*To all whom it may concern:*

Be it known that I, EPPY W. FERGUSON, a citizen of the United States, residing at Owensboro, in the county of Daviess and State of Kentucky, have invented new and useful Improvements in Hand Seeding Implements, of which the following is a specification.

The invention relates to an improvement in hand seeding implements designed, primarily, for use in removing peach-stones from the fruit.

The main object of the present invention is the production of a simple device of the character described designed for easy and convenient manual manipulation to quickly and effectively remove the stone-pit from peaches.

The invention will be described in the following specification, reference being had particularly to the accompanying drawings, in which—

Figure 1:
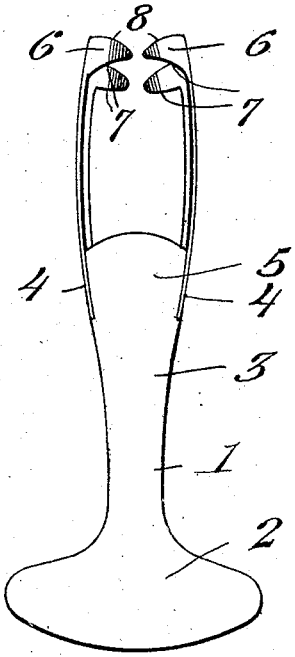
Figure 2:
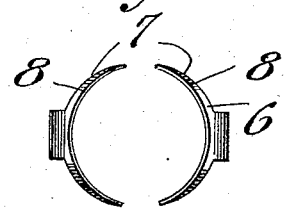

Figure 1 is a perspective view of a seeder constructed in accordance with my invention. Fig. 2 is a top plan view of the same, the handle portion being omitted.

Referring to the drawings, my improved seeder comprises a handle 1, which may be of any desired size and shape, though preferably comprising an enlarged head 2 and a projecting stem 3.

At diametrically opposite points on the stem I secure blades 4, preferably concavo-convex in section and constructed of resilient metal. The blades 4 extend above the stem 3 of the handle for the desired distance, being preferably curved longitudinally above the stem, as clearly shown in Fig. 1.

The stem 3 is formed with a slightly-flaring head 5, thereby providing an enlarged end to conform to the longitudinal curvature of the blades, it being understood that at the free ends the blades are spaced apart to a less extent than at the mid-length thereof, the end spacing being less than the transverse dimension of a peach-stone.

At the free ends the blades 4 are formed with cutters 6 of curved or arcuate shape in plan. The cutters are of thin material, having their width or greatest sectional dimension transverse their length arranged in the plane of the blades 4 and being of a length to extend beyond the side edges of the blade, so that said cutters form an approximately circular cutting-band at the ends of the blade. The lower edges of the cutters project at approximately a right angle to the longitudinal plane of the blades, as at 7, while the upper edges 8 thereof are of rounded contour longitudinally of the cutters, having their highest point centrally above the blades 4 and curving therefrom toward the ends of the cutters, terminating coincidently with the lower edges. The upper and lower edges 7 and 8 are sharpened throughout the length of the cutters.

In use the cutter, manually operated by the handle 1, is introduced into the peach from the stem end, preferably by a rotary reciprocatory movement of the cutters and blades, the inward movement being continued until said blades pass beyond the peach-stone. As the blades contact with the stone they effectively separate the meat of the fruit therefrom, thoroughly clean the same, and withdrawing the same upon the reverse movement of the seeder.

With peaches of the freestone variety the cutters are effective for reaming out the bitter red portion of the peach immediately enveloping the stone, while in clingstone peaches the stone is thoroughly and cleanly separated from the fruit and removed with the seeder.

The seeder of my invention, it will be noted, is effective for removing the stone without breaking the peach, thus enabling the fruit to be used whole for canning and other purposes.

Having thus described the invention, what is claimed as new is—

1. A seeder comprising a handle, blades projecting therefrom, and duplicate cutters carried at the free ends of the blades, said cutters curving toward each other to provide an approximately circular cutter at the operative end of the seeder, the relatively forward edge of each cutter being sharpened.

2. A seeder comprising a handle, blades projecting therefrom, and curved cutters carried by the ends of the blades, the edges of the cutters next the handle projecting at an angle to the plane of the blades to provide an approximately circular edge to engage the seed in the withdrawing operation.

In testimony whereof I affix my signature in presence of two witnesses.

EPPY W. FERGUSON.

Witnesses:
　THEO. MACKIM,
　C. B. ELLIOTT.